United States Patent [19]

Bottum

[11] 4,277,946
[45] Jul. 14, 1981

[54] HEAT PUMP

[76] Inventor: Edward W. Bottum, 9357 Spencer Rd., Brighton, Mich. 48116

[21] Appl. No.: 66,046

[22] Filed: Aug. 13, 1979

[51] Int. Cl.³ .................. F25B 27/00; F25B 27/02; F25D 23/12
[52] U.S. Cl. .................. 62/235.1; 62/260; 62/238.6; 165/45; 165/48 S
[58] Field of Search .................. 165/48 S, 48 R, 45; 62/2, 238 E, 260

[56] References Cited

U.S. PATENT DOCUMENTS

| | | | |
|---|---|---|---|
| 2,503,456 | 4/1950 | Smith | 62/260 |
| 2,513,373 | 7/1950 | Sporn et al. | 62/260 |
| 2,529,154 | 11/1950 | Hammond et al. | 62/260 |
| 2,689,090 | 9/1954 | Wetherbee et al. | 62/260 |
| 3,188,829 | 6/1965 | Siewert et al. | 62/238 E |
| 3,464,219 | 9/1969 | Closs et al. | 62/260 |
| 3,943,722 | 3/1976 | Ross | 62/260 |
| 3,965,694 | 6/1976 | Vignal et al. | 62/260 |
| 4,011,736 | 3/1977 | Harrison | 62/260 |
| 4,042,012 | 8/1977 | Perry et al. | 62/260 |
| 4,091,636 | 5/1978 | Margen | 62/260 |

Primary Examiner—Lloyd L. King
Attorney, Agent, or Firm—Whittemore, Hulbert & Belknap

[57] ABSTRACT

An earth type heat pump having a heat exchanger including an evaporator coil and a compressor, condenser, receiver and expansion valve in series with the evaporator coil for delivering heat picked up at the heat exchanger from the condenser, and heat pickup tubes positioned vertically in the earth and connected with the heat exchange structure for passively supplying heat from the earth to the heat exchanger by means of a refrigerant passing between the heat pickup tubes and heat exchange structure, and the corresponding method of supplying heat from an earth type heat pump. In one modification the heat of the earth is supplemented by a solar heating system including a collector and heater tubes connected to the collector positioned vertically and interspersed with the heat pickup tubes of the heat pump. In another modification of the invention, heat transfer between the vertically positioned tubes is promoted by structure for and the method of moistening the earth around the vertical heat pickup tubes and the heater tubes.

9 Claims, 1 Drawing Figure

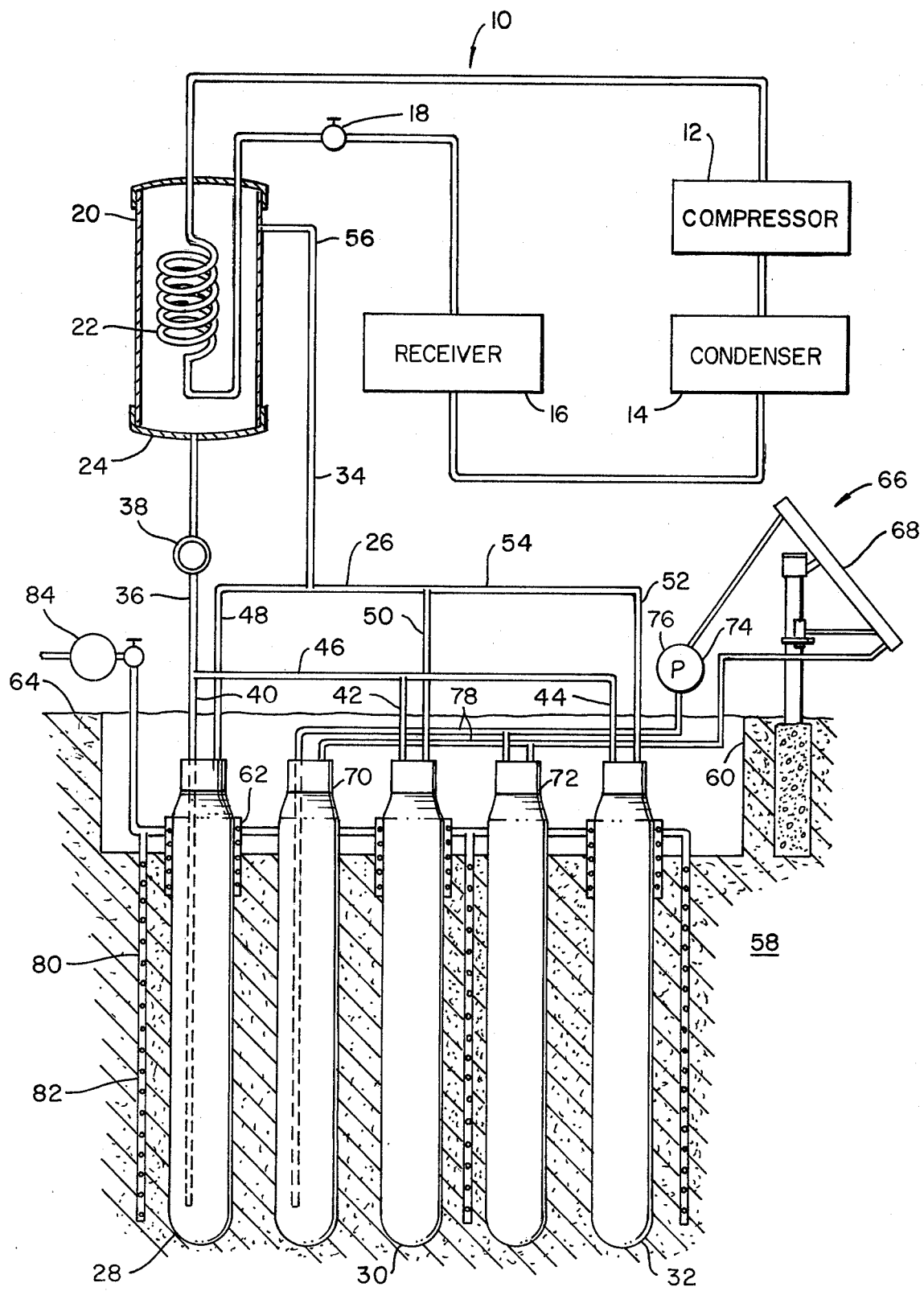

HEAT PUMP

BACKGROUND OF THE INVENTION

1. Field of the Invention

The invention relates to heat pumps and method and refers more specifically to an earth type heat pump and method of operation thereof wherein vertical heat pickup tubes are provided in the earth operable in conjunction with heat transfer structure to passively provide heat from the earth to the heat pump, which earth type heat pump may be assisted with a solar heating system for heating heater tubes by means of a solar collector, which heater tubes are positioned vertically adjacent the heat pickup tubes and/or assisted by structure for and the step of adding moisture to the earth around the tubes.

2. Description of the Prior Art

In the past, earth type heat pumps have historically been connected with long lengths of tubing embedded in trenches extending horizontally at depths of approximately six feet. When such heat transfer tubes have been used with direct expansion in the earth, excessive pressure drop and return of oil to the compressor have been system problems. A fraction of a pound of pressure drop in such system results in a great decrease in capacity of the heat pump compressor. Also with such systems it has usually been necessary to manifold the pipes in the earth which is likely to result in oil being trapped due to lack of velocity and not being returned to the heat pump, resulting in burned out compressors. Another alternative in earth type heat pumps has been to use the horizontal trenches with a hydronic fluid circulated through the horizontal pipes and through a heat exchanger. Such structure eliminates the problem of oil return. However, such system still utilize considerable energy in circulating the hydronic fluid and require a considerable surface area to be excavated for the placement of the heat pickup tubes in the earth.

SUMMARY OF THE INVENTION

In accordance with the invention, an earth type heat pump is provided wherein a heat exchanger including an evaporator coil and tank, a compressor, condenser, receiver and expansion valve are connected in series with the heat exchanger evaporator positioned between the expansion valve and compressor. The heat exchanger is supplied with heat from the earth by means of a refrigerant passively circulating between the tank of the heat exchanger and the vertically positioned heat pickup tubes. The vertically positioned heat pickup tubes are particularly efficient in taking heat from the earth and require a very small surface area as, for example, next to a building wall for installation, and their insulation requires very little excavation in the limited surface area.

Further in accordance with the invention, the efficiency of the vertically positioned heat pickup tubes may be increased through the use of solar assist structure to heat the earth around the heat pickup tubes by means of a collector positioned at the surface of the earth, vertical heater tubes positioned in the ground adjacent the heat pickup tubes, and means for circulating a heat transfer medium between the solar collector and heater tubes.

The earth type heat pump of the invention may further be assisted by providing vertically extending water dispersion pipes vertically in the ground in the area of the heat pickup tubes connected to a water supply to moisten the earth surrounding the tubes.

The method of the invention includes the step of providing vertically positioned heat pickup tubes in an earth type heat pump whereby heat is more efficiently picked up from the earth utilizing a limited surface area and transferred to a heat exchanger. The method further includes the solar assisted heating of the heat pickup tubes and the step of moistening the earth around the tubes to provide more efficient heat transfer in the earth.

BRIEF DESCRIPTION OF THE DRAWING

The drawing is a diagrammatic representation of an earth type heat pump constructed in accordance with the invention, including solar assist structure and structure for moistening the earth in combination therewith for effecting the method of the invention.

DESCRIPTION OF THE PREFERRED EMBODIMENT

As shown in the Figure, the earth type heat pump 10 of the invention includes a compressor 12, condenser 14, receiver 16, expansion valve 18, and the heat transfer structure 20, including the evaporator coil 22 and the tank 24. The earth type heat pump 10 further includes the structure 26 for passively taking heat from the earth and passing it through the heat exchange structure 20, including the vertically positioned heat pickup tubes 28, 30 and 32 and the conduit structure 34 and 36 for manifolding the heat pickup tubes 28, 30 and 32 together and connecting them to the tank 24 of the heat transfer structure 20, as shown.

In operation of the earth type heat pump 10, gaseous refrigerant is passed from the evaporator coil 22 of the heat transfer structure 20 to the compressor 12 where it is compressed and passed to the condenser 14. The compressed gas is liquefied in the condenser 14 and gives up heat from the condenser. The liquid refrigerant from the condenser is passed into the receiver 16 from which it is passed through the expansion valve 18 into the evaporator coil 22 of the heat exchanger 20 where the refrigerant picks up heat from the heat transfer medium in the tank 24 of the heat exchanger 20 and is again evaporated into a gas to be recycled through the compressor.

The heat transfer medium in the tank 24 of the heat exchanger 22 is a refrigerant which is passively circulated through the vertically extending heat pickup tubes of the earth type heat pump 10. Thus, liquid refrigerant from the heat exchanger 20 in the tank 24 having been condensed during the heat transfer to the refrigerant in the coil 22 is passed by gravity through the sight glass 38 in conduit 36 to the bottom of the vertically positioned heat pickup tubes 28, 30 and 32 through the conduits 40, 42 and 44 and manifold structure 46. The liquid refrigerant boils in the tubes 28, 30 and 32 and passes out of the top of the tubes through the conduits 48, 50 and 52 through manifold 54 and is directed to the top of the tank 24 through the conduit 56.

The tubes 28, 30 and 32, as shown, are positioned vertically in the earth 58 and may terminate in a trench 60 in which the manifold conduits 46 and 54 may be positioned. It may also be that the trench 60 may be covered with a grating or the like, not shown, whereby the conduits 36–56 may be manifolded in the trench 60 for easy access should maintenance be necessary.

The tubes 28, 30 and 32 may be relatively easily positioned in a small surface area spaced two to four feet apart and may extend for a depth of approximately twelve to twenty feet economically. The tubes 28, 30 and 32 themselves may be, for example, three to four inches in diameter. Insulating material 62 may be positioned around the tops of the tubes 28, 30 and 32 above the earth frost line so as to prevent loss of heat therefrom in cold climates adjacent the earth surface 64.

The heating system including the compressor 12, condenser 14, receiver 16, expansion valve 18 and evaporator coil 22 is connected to the passive heat pump including the heat collector tubes 28, 30 and 32 and the tank 24 and their respective connections only through the heat exchanger 20. Also, it will be noted heat moves from the ground with no expenditure of energy in such system. Also, the pressure drop through the evaporator coil will be only that through the coil in the heat exchanger and that there is no place the oil can be trapped resulting in damage to the compressor.

Further, in accordance with the invention the earth type heat pump 10 is aided in the collecting of heat from the earth by the solar structure 66 including the solar collector 68, heater tubes 70 and 72, and the structure 74 for circulating heat transfer medium between the solar collector 68 and the heater tubes 70 and 72 including the pump 76 and the manifolded conduits 78.

In operation of the solar structure 66 a medium in the solar heat structure collects heat from the sun's rays in the solar collector 68 and transfers it into the heater tubes 70 and 72 from which it is transferred into the earth. The heat transferred into the earth is then picked up by the vertical heat pickup tubes 28, 30 and 32 of the earth type heat pump 10. The cooled heat transfer medium is returned to the solar collector 68 and reheated.

To make the earth type heat pump 10 and solar heat structure even more efficient, an earth watering system 80 including vertically extending water pipes 82 and a water supply system 84 is shown with the water pipes 82 extending vertically and interspersed with the tubes 28, 30 and 32, 70 and 72. As desired, the earth surrounding the tubes is moistened periodically through water passed from the water supply 84 through the water pipes 82 to aid in the conduction of heat to the earth from the heater tubes 70 and 72 and to the heat pickup tubes 28, 30 and 32. The earth watering system 80 may be used with either the basic earth type heat pump 10 described above or with the solar assisted earth type heat pump. The amount of water required will not be great and the intervals at which the water might be turned on is typically once every twenty-four hours for approximately ten minutes.

While one embodiment of the present invention has been considered in detail, it will be understood that other embodiments and modifications thereof are contemplated by the inventor. It is the intention to include all embodiments and modifications as are defined by the appended claims within the scope of the invention.

I claim:

1. The method of providing heat from an earth type heat pump comprising connecting a heat exchanger, compressor, condenser, receiver and expansion in series, whereby refrigerant in the form of gas received at the compressor is compressed and passed to the condenser wherein heat is given off and the gas is liquefied and passed to the receiver from which it is passed through the expansion valve into the heat exchanger, providing heat to the heat exchanger through heat pickup tubes vertically positioned in the earth to evaporate the refrigerant in the heat exchanger into a refrigerant gas, assisting the heat pickup of the heat pickup tubes by supplying solar heat to the earth through a collector, heater tubes vertically positioned in the earth adjacent the heat pickup tubes and means for circulating a heat transfer medium through the solar collector and heater tubes, and moistening the earth around the heat pickup tubes to increase the heat transfer from the earth to the heat pickup tubes.

2. A heat pump comprising a compressor for receiving a gaseous refrigerant from an evaporator coil of a heat exchanger including an evaporator coil and a tank and compressing it, a condenser for receiving the compressed gaseous refrigerant from the compressor and liquefying the gaseous refrigerant while giving off heat, an expansion valve for expanding the liquid refrigerant into the evaporator coil of the heat exchanger, and a refrigerant in the series connected evaporator coil, compressor, condenser, receiver and expansion valve, and means for providing heat at the heat exchanger comprising one or more vertically positioned large diameter, straight heat pickup tubes extending into the earth, conduit means directly connecting the top of the tubes to the tank of the heat exchanger adjacent the top thereof, conduit means directly connecting the bottom of the tubes with the bottom of the tank of the heat exchanger, and a heat exchange medium in the means for providing heat at the heat exchanger.

3. Structure as set forth in claim 1, wherein the heat exchanger medium in the means for providing heat at the heat exchange is a refrigerant whereby refrigerant will passively circulate through the heat exchanger tank, the heat pickup tubes and the means connecting them picking up heat from the earth in the heat pickup tubes and boiling and giving off heat in the tank and condensing.

4. Structure as set forth in claim 1, wherein a plurality of vertically extending heat pickup tubes are positioned in a trench in parallel aligned arrangement and the conduit means are manifolded in the trench.

5. Structure as set forth in claim 1, and further including insulating material positioned around the top of the heat pickup tubes to a point below the frost level of the earth.

6. Structure as set forth in claim 1, and further including means for heating the earth around the heat pickup tubes.

7. Structure as set forth in claim 6, wherein the means for heating the earth around the heat pickup tubes comprises a solar assist system including vertically extending heater tubes positioned in the earth interspersed with the heat pickup tubes, at least one solar collector, means connecting the heater tubes to the solar collector and means for circulating a heat transfer medium through the solar collector and heater tubes.

8. Structure as set forth in claim 1, and further including means for providing moisture in the earth around the heat pickup tubes comprising a plurality of vertically positioned water pipes interspersed with the heat pickup tubes connected to a supply of water.

9. A heat pump comprising a compressor for receiving a gaseous refrigerant from an evaporator coil of a heat exchanger including an evaporator coil and a tank and compressing it, a condenser for receiving the compressed gaseous refrigerant from the compressor and liquefying the gaseous refrigerant while giving off heat, a receiver for receiving the liquid refrigerant from the condenser, an expansion valve for expanding the liquid refrigerant into the evaporator coil of the heat exchanger, a refrigerant in the series connected evaporator coil, compressor, condenser, receiver and expansion valve, means for providing heat at the heat exchanger comprising a plurality of vertically positioned, large diameter, straight heat pickup tubes extending into the earth positioned in a trench in parallel aligned arrangement, conduit means directly connecting the top of the tubes of the tank of the heat exchanger adjacent the top thereof, conduit means directly connecting the bottom of the tubes with the bottom of the tank of the heat exchanger, all of which conduit means are manifolded in the trench, a refrigerant heat exchange medium in the means for providing heat at the heat exchanger whereby refrigerant will passively circulate through the heat exchanger tank, heat pickup tubes and the means connecting them picking up heat from the earth in the heat pickup tubes and boiling and giving off heat in the tank and condensing, insulating material positioned around the top of the heat pickup tubes to a point below the frost level of the earth, means for heating the earth around the heat pickup tubes comprising a solar assist system including vertically extending, large diameter, straight heater tubes positioned in the earth interspersed with the heat pickup tubes, at least one solar collector, means connecting the heater tubes to the solar collector, means for circulating a heat transfer medium through the solar collector and heater tubes, and means for providing moisture in the earth around the heat pickup tubes comprising a plurality of vertically positioned water pipes interspersed with the heat pickup tubes connected to a supply of water.

* * * * *